Figures 1, 2:
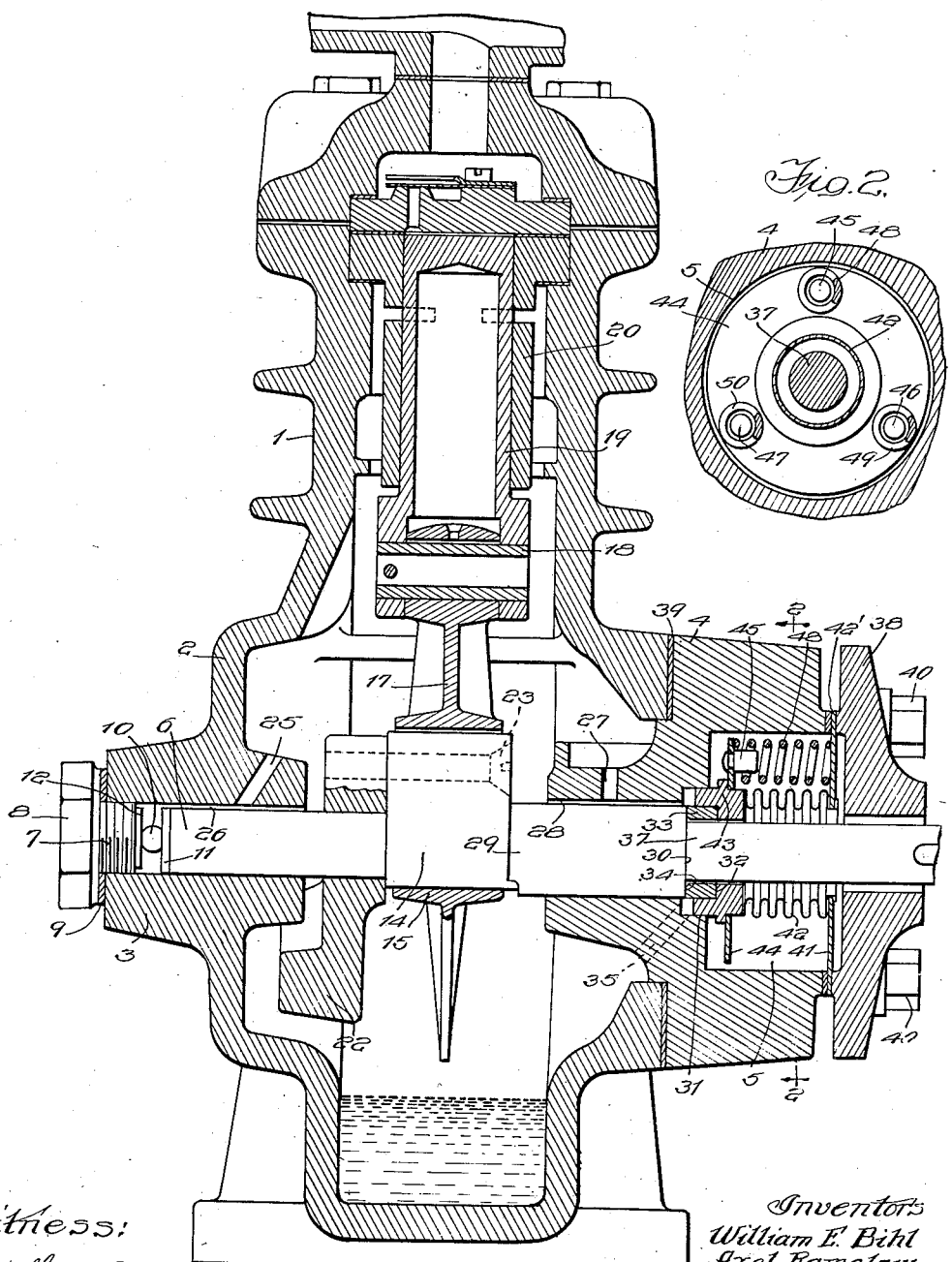

May 31, 1932.  W. E. BIHL ET AL  1,860,981
SHAFT SEAL
Filed Nov. 25, 1927

Witness:
William P. Kilroy

Inventors
William E. Bihl
Axel Ramclaw
Brown Boettcher & Dienner
Attys.

Patented May 31, 1932

1,860,981

UNITED STATES PATENT OFFICE

WILLIAM E. BIHL AND AXEL RAMCLAW, OF CHICAGO, ILLINOIS

SHAFT SEAL

Application filed November 25, 1927. Serial No. 235,480.

Our invention relates to seals for rotary shafts and the like.

While the specific embodiment herein illustrated and described is embodied in a compressor for refrigeration purposes, it is to be understood at the outset that we do not intend to limit the invention to the specific embodiment nor to the particular service herein mentioned.

By reference to our co-pending application, Serial No. 231,874, filed November 8, 1927, (Case 2), wherein we disclose a compressor for small refrigerating plants, the form of shaft seal which has heretofore been considered as the best on the market will be understood. This seal we have heretofore used (through a license under the patent to Joy No. 1,502,914) and become thoroughly familiar with its operation. The compressor shown in our prior application above referred to, and which is herein illustrated, is driven preferably at direct motor speed of approximately 1800 revolutions per minute. This cuts out the friction of a belt reduction or the like, and makes a very efficient unit.

The relatively heavy internal compression spring therein shown employed to hold the bronze graphite anti-friction ring 47 against the shoulder 46 on the shaft, provides a total pressure of about 75 pounds between these parts. Due to the small area engaged, the unit pressure runs very high, approximately 245 pounds per square inch. This absorbs, particularly in a small high speed unit, too much power and produces excessive wear merely in attempting to hold a tight joint.

In the small direct driven compressor unit herein shown, we employ a one-sixth nominal horse power motor capable of generous overload and drawing actually about 200 watts during operation. The power usefully employed in compressing the refrigerant runs considerably below that. Upon investigating the friction losses involved in this compressor, we found that there was a very large friction loss in the seal which appeared to be unavoidable in that form of seal. One reason for the high friction loss lies in the high linear speed of the engaging surfaces.

We found in keeping check of the inspections of completed machines, that the rejections due to leaking seals ran from 14% to 40%, even with the most careful workmanship in manufacturing and assembly. The inspection test consists in closing the compressor crank case and applying 100 pounds air pressure internally. The crank case is then submerged in kerosene to detect any leak. The reason we use such a high test pressure is because, in practice, when the refrigerating system is defrosting the gas pressure in the crank case of the compressor may rise quite high and the seal must be able to hold it.

After a careful study of the action of that seal, we found that if the seal were slightly cocked, as by accidental bending of the flexible bellows, the seal was almost certain to leak. Then we tried the use of a heavier spring to see if greater spring pressure would not straighten out the bellows. We found that helped very little, but increased the power consumption in friction unduly. We used the thinnest metal recommended by the manufacturers of the bellows and that did not make any difference that we could detect.

We then analyzed the action of the spring and its relation to the bellows, and concluded that when the spring is so stiff and the guiding surface provided by the end of the anti-friction ring against the shoulder of the shaft has such a small leverage, we could not avoid the rejects that were constantly occurring. We concluded that the cocking action which seemed to occur in such a large percentage of the devices was due largely to the character of the spring. The spring is, in reality, only a rod extending in a helical path between two surfaces. Where the end of the spring rests against the supporting surface, the greatest pressure naturally occurs. We found that we were not getting an even peripheral pressure from the stiff short spring which that construction demands.

According to the preferred form of our invention, we provide pressure at three substantially equidistant points between the fixed abutment and the plate that bears the antifriction ring. This plate, which may be in the form of a spider, provides a relatively large leverage for the spring. At the same time, we reduce the diameter of the bellows and dispose the same inside of the spring.

In using this seal we find that the spring pressure can be greatly reduced. In fact, we use only eight to ten pounds spring pressure as against seventy-five pounds formerly used. This keeps a tight seal under the same test pressure of 100 pounds per square inch air pressure, because of the much smaller and somewhat stiffer bellows. By the relatively large leverage and the three-point application of pressure, cocking of the sealing ring is eliminated.

But the remarkable thing which this invention accomplishes is a large reduction of the frictional loss at the same time that rejections are practically eliminated. While the compressor with the old style seal had required 200 watts at full load, the same compressor with the seal of our invention requires only 150 watts at full load.

Further than this, the 50 watts which were thus saved, not only increased the mechanical efficiency of the device, but by getting rid of the heat developed by the friction the compressor operates at greater volumetric and greater thermal efficiency.

By cutting the number of rejects and simplifying the mechanical structure, we have also cut shop cost. Thus, we have decreased shop cost, increased capacity and efficiency and decreased current consumption.

Now, in order to acquaint those skilled in the art with the manner of constructing and operating a device embodying our invention, we shall describe in connection with the accompanying drawings, a specific embodiment of our invention.

In the drawings:—

Fig. 1 is a vertical section through a compressor embodying the shaft seal of our invention; and Fig. 2 is a cross section taken on the line 2—2 of Fig. 1.

Since the structure of the compressor herein shown is the same as that disclosed and claimed in our prior application above referred to, we shall make only general reference to the same.

The compressor comprises a cylinder member 1 having, in this case, an integral crank case 2 at one side of the same having an integral bearing boss 3, and having at the other side of the same a removable bearing member 4, which bearing member provides at the same time a hollow boss containing the cavity 5. The crank shaft 6 has a bearing portion of reduced diameter lying within the bearing in the boss 3. The outer end of the boss is closed by a screw plug 7 having a polygonal head 8 clamping a gasket 9 against the end of the boss to provide a fluid tight seal at all times. A thrust bearing in the form of a ball 10 and a pair of anti-friction plates 11—12 takes up the end thrust of the seal which will be presently described.

The crank shaft has a throw or crank portion 14 which, in reality, is an eccentric member with a cylindrical bearing surface adapted to be engaged by the crank bearing portion 15 of the connecting rod 17, the upper end of which has a bearing on the hollow wrist pin 18 connected to the piston 19 which plays in the inner cylinder member 20.

It will be understood that the gas inlet leads into the interior of the crank case and that the bottom of the crank case is filled with a body of lubricant which is adapted to be distributed around the inside of the crank case by a throwing device or dipper 21 connected to the lower end of the connecting rod bearing 15.

A counterweight 22 is mounted on the reduced end of the shaft 6 to the left of the crank throw 14 and is connected to the side of the crank throw by a machine screw 23 shown in dotted lines.

The bearing portion 3 has an oiling duct 25 leading from an oiling groove 26 for oiling the portion of the crank shaft 6 which lies within the bearing 3.

The removable bearing member 4 likewise has an oil duct 27 and an oil groove 28 for lubricating the enlarged cylindrical portion 29 of the crank shaft 6 which lies within a bearing of the member 4.

The enlarged portion 29 has a shoulder 30 which lies in a transverse plane to axis of the crank shaft 6.

At the inner end of the cavity 5 there is a cylindrical bearing space 31 for guiding a ring member 32 which has an anti-friction ring 33 secured into a recess in said ring member 32, as by soldering, said anti-friction ring 33 providing a face or shoulder 34 for engaging the shoulder 30 on the crank shaft. The two shoulders 30 and 34 lie in fluid tight engagement to provide a seal between the inside of the crank case and atmosphere.

The cavity 5 is connected to the interior of the crank case by a draining duct 35 which leads into the space formed between the ring 32 and the bottom of the recess which has the guiding surface 31 for guiding the ring 32. This permits any oil which gradually works through the bearing 30—34 to run back into the crank case. The ring 32 and its guiding surface 31 are not intended to provide a fluid tight joint, but are intended to hold these parts sufficiently centered so that the anti-friction facing or ring 33 and the ring member 32 shall not come into engagement with the cylindrical surface of the reduced portion of the crank shaft which is indicated at 37 and which lies to the right of the shoulder 30.

This portion 37 of the crank shaft extends out through the clamping plate 38 and is adapted to be coupled through a suitable coupling to the shaft of the driving motor so that the compressor is run at substantially full motor speed, that is, of the order of 1800 revolutions per minute. Obviously, it may be driven at any speed desired.

Bearing member 4 is clamped to the side of the crank case 2 with a suitable sealing gasket 39 between the parts to make a fluid tight joint. Clamping plate 38 is likewise clamped against a hollow boss of the member 4 by suitable clamping bolts or cap screws 40—40, binding between the cap 38 and the member 4 the outer margin of a plate 41 a gasket 42' serving to make a fluid tight joint between said plate 41 and the adjacent edge of the hollow boss of the member 4.

The plate 41 is apertured to pass the shaft 37 and the end of a metal bellows 42 is connected by a fluid tight joint to the inner peripheral margin of the apertured plate 41, and at its opposite end the bellows 42 is connected to the ring member 32.

The ring member 32 has a peripheral shoulder 43 against which bears the spring follower 44 which is in the shape of a thin circular apertured plate embracing the right hand end of the ring member 32 adjacent said shoulder 43. This spring follower, while it is shown as a plate, might obviously be a spider. It need not be secured to the ring member 32. The spring follower 44 has three pins 45, 46 and 47 secured to it, and three similar compression springs 48, 49 and 50 are held in place by these pins 45, 46 and 47 between the spring follower 44 and the plate 41.

These springs lie outside of the metal bellows 42 and since the spring follower 44 has a flat planar surface engaging the flat planar surface of the collar 43, the spring pressure applied at three points and the springs 48, 49 and 50 being all of equal length and of the same characteristic, provide evenly applied pressure to the anti-friction member 33 to keep it in fluid tight engagement with the shoulder 30 on the shaft portion 29 so as to maintain a fluid tight seal with very little spring pressure and, consequently, a small resultant friction.

Since the springs 48, 49 and 50 lie outside of the metal bellows 42 and act through the follower 44, they have a leverage on the ring member 32 and its anti-friction face 33 with respect to the bellows 42 great enough to prevent any stiffness or any set of the bellows 42 within reasonable limits from affecting the tightness of the seal.

By making the bellows 42 smaller than the earlier form of bellows, we have made the same stronger, pneumatically and mechanically, even for the same thickness of metal. Also, because of the greater ratio of length to diameter, the bellows 42 is more flexible, even for the same thickness of metal, and is less able to resist the pressure of the spring. Hence, this position of the spring means outside of the bellows provides an improvement over the devices of the prior art. Also, the three-point application of the pressure provides an improvement, whether it be inside or outside of the bellows 42.

There is another feature which is important and that is, that pneumatic pressure acting upon the bellows 42 does not have anywhere near the power to break the seal which the larger diameter of bellows previously provided.

It can be seen that, in addition to the mechanical advantages of the seal, its effect on the refrigerating compressor is profound and results in a marked improvement in capacity and lowering of operating cost.

We do not intend to be limited to the details shown and described.

We claim:—

In combination, a bearing having a hollow boss, a shaft mounted in the bearing and projecting through the boss, said boss having a reduced recess at its inner end encircling the shaft and the shaft having a shoulder adjacent the inner end of the recess, a ring fitting about the shaft and in fluid tight contact with the shoulder, a second ring fitting about the first ring in fluid tight contact therewith and extending into the outer end of the recess for an appreciable distance, the outer circumferential surface of said second ring being parallel to its axis and in fluid tight contact with the surrounding wall of the recess, a bellows structure extending about the shaft and secured at its inner end to said second ring, a plate encircling the shaft and closing the outer end of the boss, said bellows structure having a flange member at its outer end clamped between the plate and the boss, said second ring having a radially outwardly-extending flange disposed beyond the recess and in the relatively large hollow of the boss, a follower seating on the outer face of said flange, and a plurality of expansion springs disposed outside of the bellows structure and confined between the follower and said flange member, said springs being spaced apart circumferentially of the follower.

In witness whereof, we hereunto subscribe our names this 22 day of November, 1927.

WILLIAM E. BIHL.
AXEL RAMCLAW.